United States Patent [19]

Ho

[11] Patent Number: 5,467,734
[45] Date of Patent: Nov. 21, 1995

[54] MOVABLE ANIMAL HOUSE

[76] Inventor: Ying-Kuon Ho, No. 22, Alley 18, Lane 75, An Ping Road, Tainan, Taiwan

[21] Appl. No.: 255,606

[22] Filed: Jun. 8, 1994

[51] Int. Cl.$^6$ ................................................ A01K 31/08
[52] U.S. Cl. ........................................................ 119/19
[58] Field of Search ............................... 119/15, 19, 17, 119/18

[56] References Cited

U.S. PATENT DOCUMENTS

| | | | |
|---|---|---|---|
| 4,763,606 | 8/1988 | Ondrasik, II | 119/19 X |
| 5,253,612 | 10/1993 | Goetz | 119/17 |
| 5,280,767 | 1/1994 | Goetz | 119/19 |
| 5,307,758 | 5/1994 | Ho | 119/19 |

*Primary Examiner*—Gene Mancene
*Assistant Examiner*—Thomas Price
*Attorney, Agent, or Firm*—Pro-Techtor International

[57] ABSTRACT

An animal house includes a number of elements that can be easily assembled and disassembled, the elements can be arranged in a compact configuration and can be packaged in a small box such that the animal house has a configuration that is good for transportation purposes. The animal house includes four wheels disposed in the bottom portion for facilitating movement of the animal house. Four stops are slidably engaged in the animal house for engaging with the wheels so as to limit rotational movement of the wheels.

4 Claims, 7 Drawing Sheets

MOVABLE ANIMAL HOUSE

BACKGROUND OF THE INVENTION

1. Field of the Invention

The present invention relates to an animal house, and more particularly to a movable animal house.

2. Description of the Prior Art

It is well-known that there is something what is called a portable case into which the pet fancier put his house pet he keeps so as to be able to carry it about when going out. However, such kind of portable case heretofore in use has a weak point of occupying a great deal of space at the time of putting it in order because it is always tenacious of a cubical form even when being not used. In addition, such kind of case can not be easily moved because it has no wheels provided thereto.

The present invention has arisen to mitigate and/or obviate the afore-described disadvantages of the conventional animal houses.

SUMMARY OF THE INVENTION

The primary objective of the present invention is to provide a movable animal house which is so designed as to be able to be easily assembled.

The other objective of the present invention is to provide a movable animal house which can be easily moved.

In accordance with one aspect of the invention, there is provided a movable animal house comprising a pair of compartments including a lower portion pivotally coupled together and including an upper portion having a land grip means provided thereon, the pair of compartments including a bottom portion having at least two wheel axles extended therefrom, and including at least one open side portion having a door pivotally coupled thereto for enclosing the open side portion, means for locking the door to the compartments, at least two wheels rotatably engaged on the wheel axles for moving the animal house.

The pair of compartments include at least two stop means slidably disposed therein, each of the the stop means includes a bulge extended therefrom, the wheels each includes at least two stubs extended toward the stop means, the bulge is located between the stubs for limiting rotational movement of the wheels, and the wheels are freely rotatable when the bulge is disengaged from the stubs. The pair of compartments include at least two pairs of 8-shaped apertures, the stop means each includes two extensions engaged in time apertures such float the extensions are movable up and down in the apertures.

The door includes a recess formed therein, and a lid means pivotally coupled to the door for enclosing the recess. The locking means includes a cap secured to the door, a latch slidably engaged between the cap and the door, a knob including a shaft extended through the door for engaging with the latch so as to move the latch when the knob is rotated, the latch is moved to engage with the compartments by the knob so as to secure the door to the compartments.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1A is an enlarged partial perspective view of the movable animal house;

DETAILED DESCRIPTION OF THE PREFERRED EMBODIMENT

Figure 1:
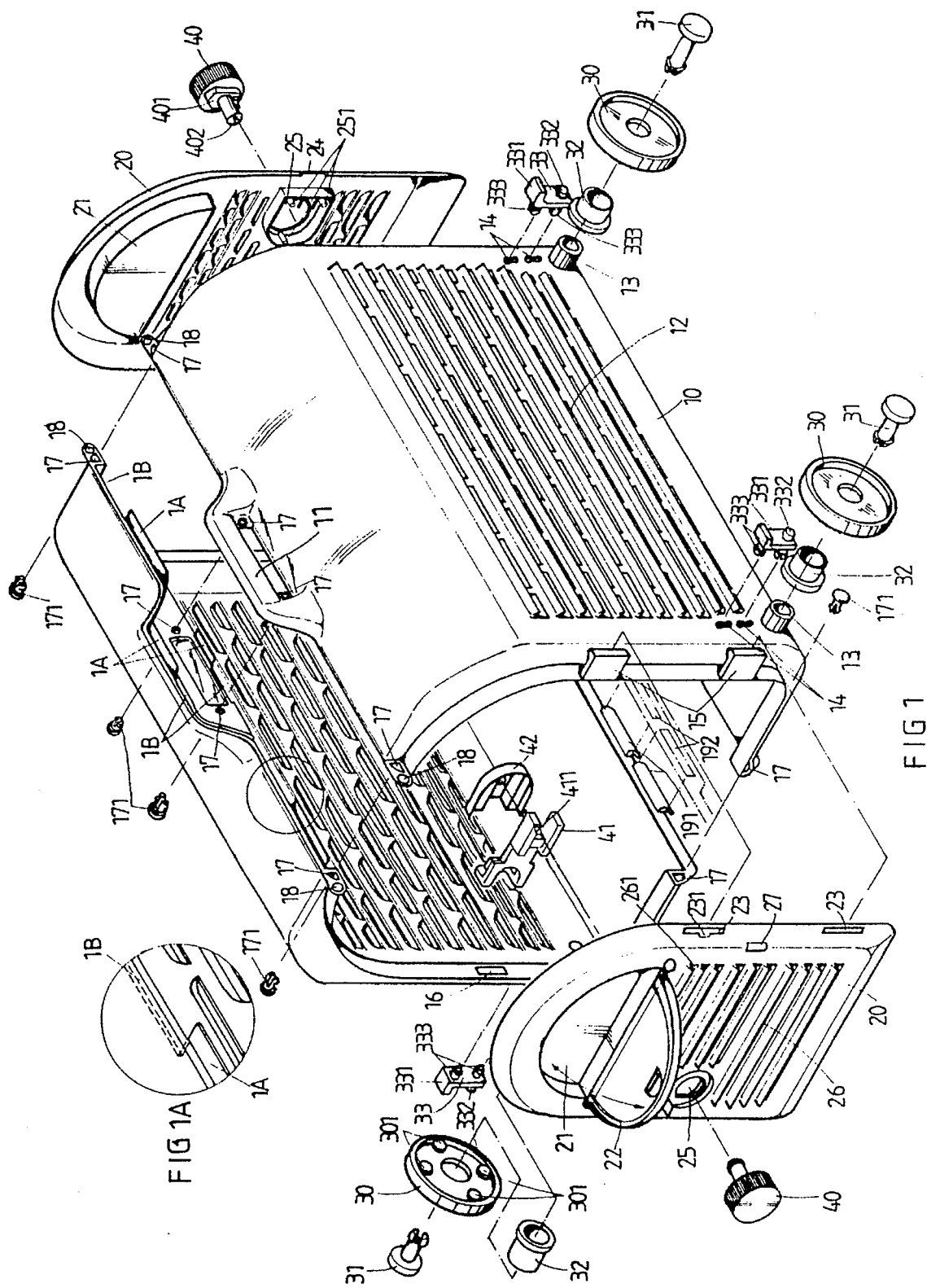
FIG. 1 is an exploded view of a movable animal house in accordance with the present invention.
Figure 7:
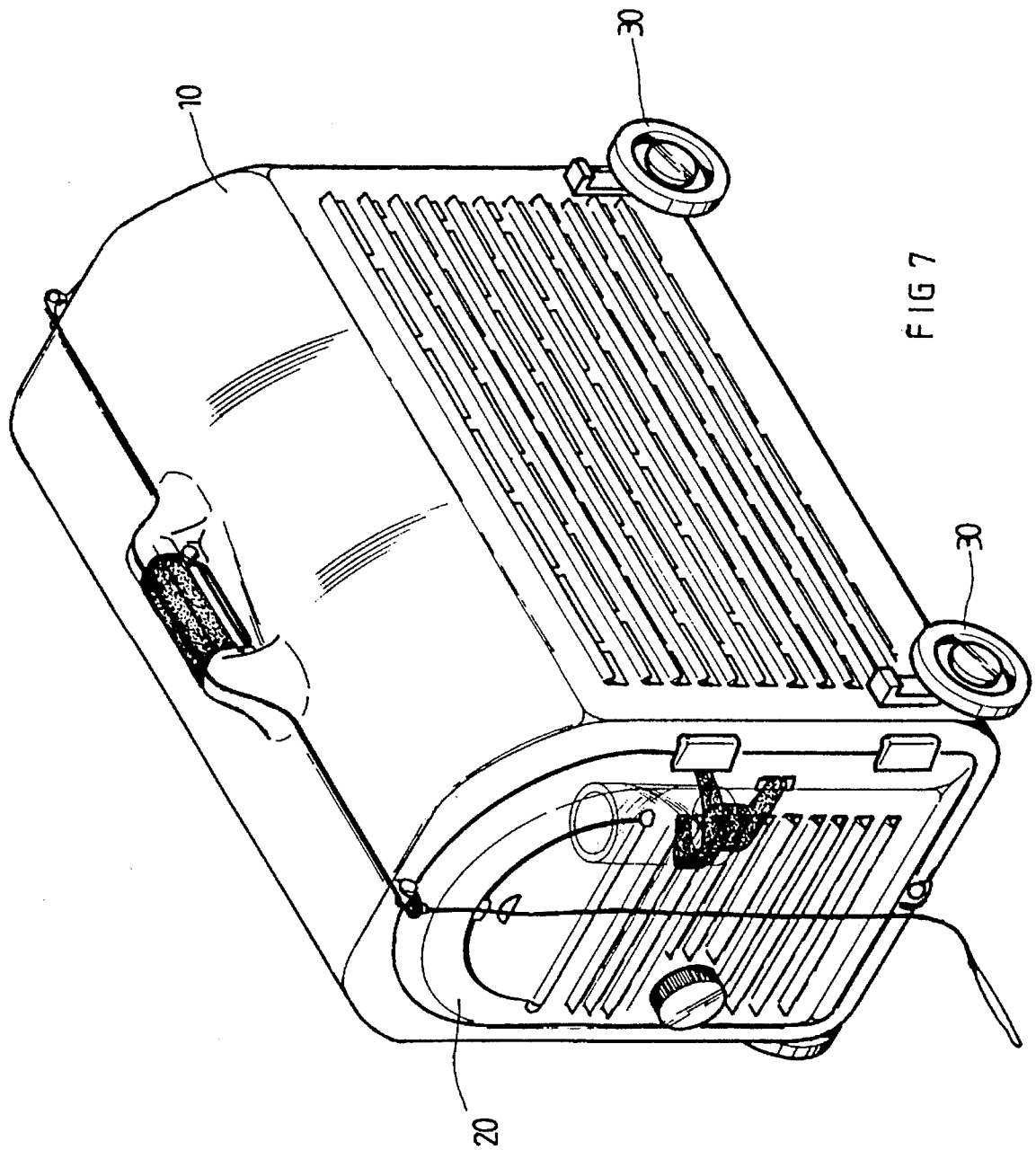
FIG. 7 is a perspective view of the animal house.

Referring to the drawings, and initially to FIG. 1, a movable animal house in accordance with the present invention comprises a pair of compartments each having a C-shaped cross section and each having a plurality of air holes 12 formed therein. Each of the compartments 10 includes a hand grip 11 provided in the upper portion. The upper portions of the compartments 10 include corresponding protrusions 1A and depressions 1B (FIG. 1A) for engaging with each other so as to secure the upper portions of the compartments 10 together. The bottom portions of the compartments 10 include corresponding engaging means 191, 192, such as curved hooks 191 and depressions 192 (FIG. 9), for engaging with each other so as to pivotally couple the bottom portions of the compartments together. The compartments 10 each includes a number of holes 17 formed therein for engaging with engaging means 171 so as to secure the compartments 10 together. Two holes 18 are formed in the upper portion of each of the compartments 10 for threading rope or chain which can be used for pulling and moving the animal house (FIG. 7). The bottom portions of the compartments 10 each includes a pair of wheel axles 13 extended therefrom and four apertures 14 formed therein. The compartments 10 each includes two side portions each having two lugs 15 and two orifices 16 formed therein.

Figure 2:
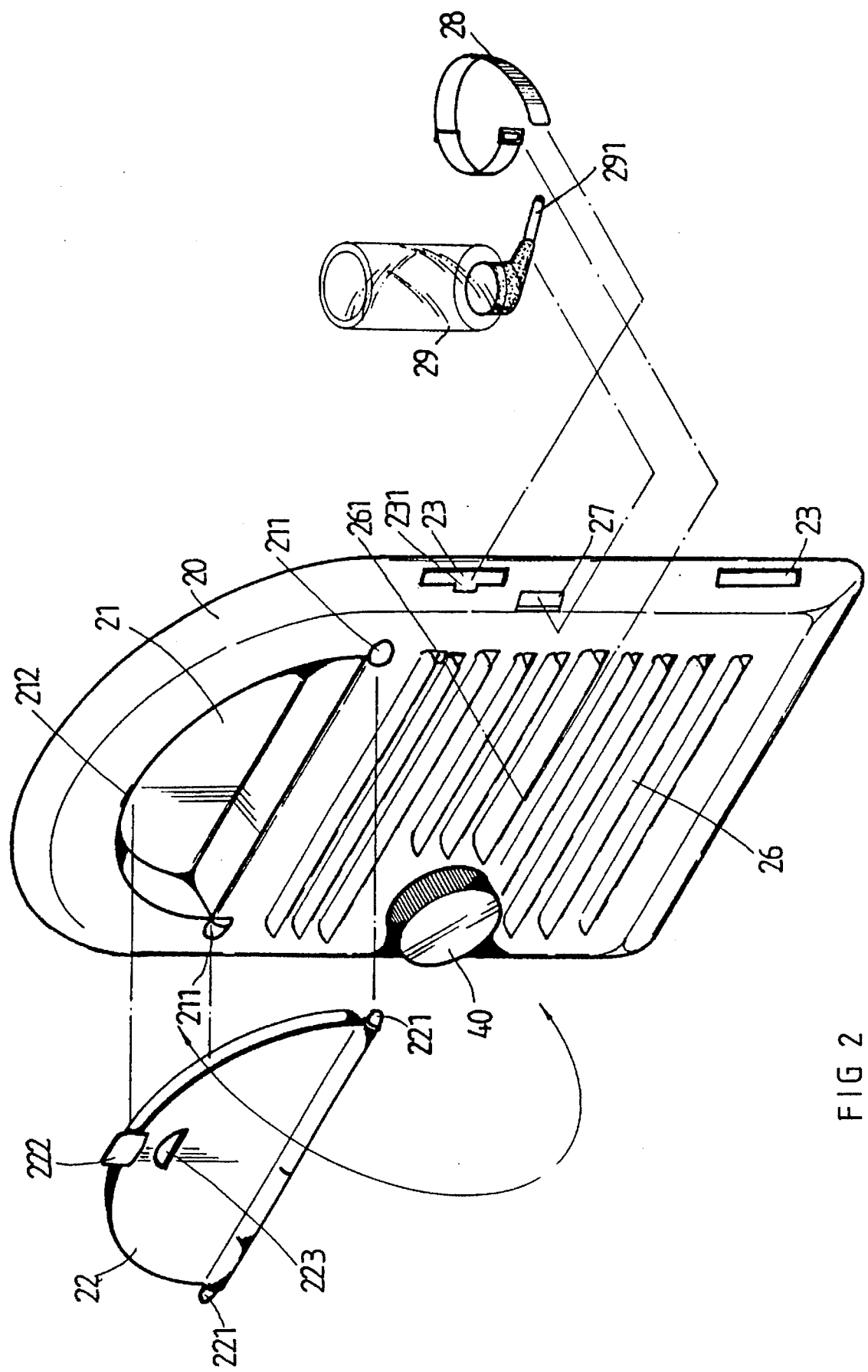
FIG. 2 is an exploded view of a side door of the animal house.
Figure 5:
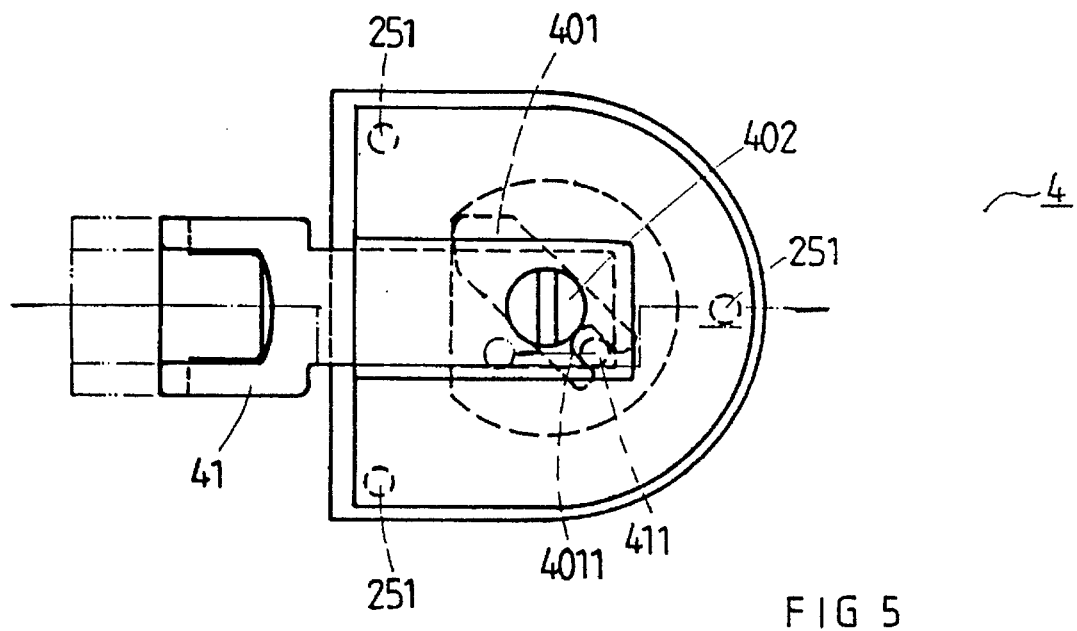
FIG. 5 is a plane view of a lock device.
Figure 6:
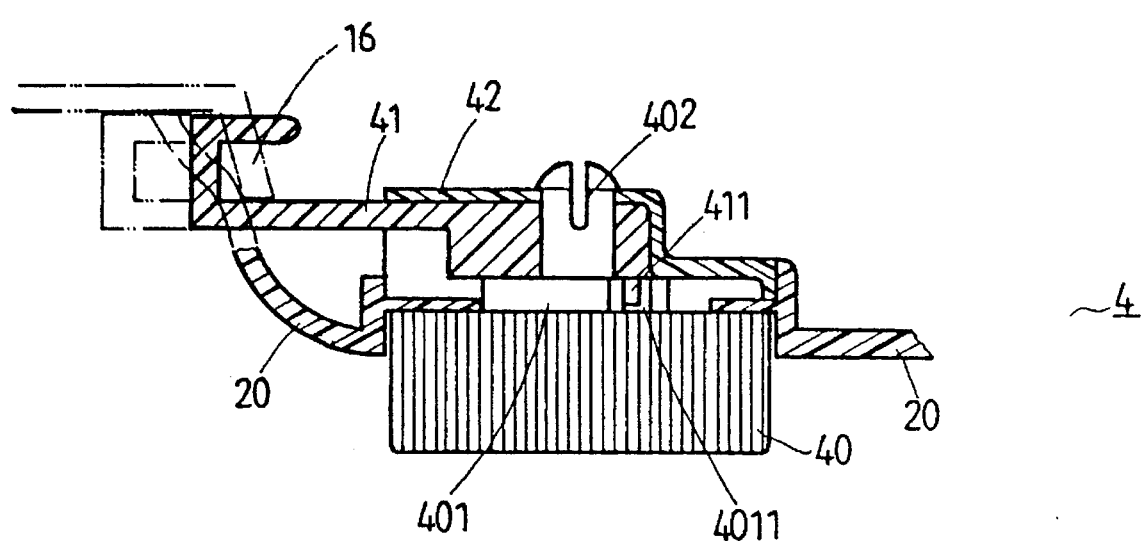
FIG. 6 is a cross sectional view of the lock device as shown in FIG. 5.

Referring next to FIG. 2, and again to FIG. 1, two doors 20 each includes a number of air holes 26 and each includes two orifices 23 for engaging with the lugs 15 so as to engage the doors 20 to the compartments 10. A flexible strap 28 engages through holes 231, 261 for securing a bottle 29 to the door 20. The bottle 29 includes a delivery tube 291 extends through the door 20 via an opening 27 for feeding water to the animals. The door 20 includes a recess 21 formed in the upper portion for receiving animal food or other objects. A lid 22 includes a pair of projections 221 extended outward from the bottom portion for engaging with two holes 211 of the door 20 so as to pivotally engage the lid 22 to the door 20. A lug 222 extends upward from the lid 22 for engaging with a hole 212 of the door 20 so as to retain the lid 22 in place. An opening 223 is formed in the lid 22 for opening the lid 22. The door 20 further includes an opening 25 formed therein for engaging with a shaft 402 extending from a knob 40 of a lock device 4 (FIGS. 5 and 6), and includes three pins 251 extended in the inner portion of the opening 25 (FIG. 1).

Figure 4:
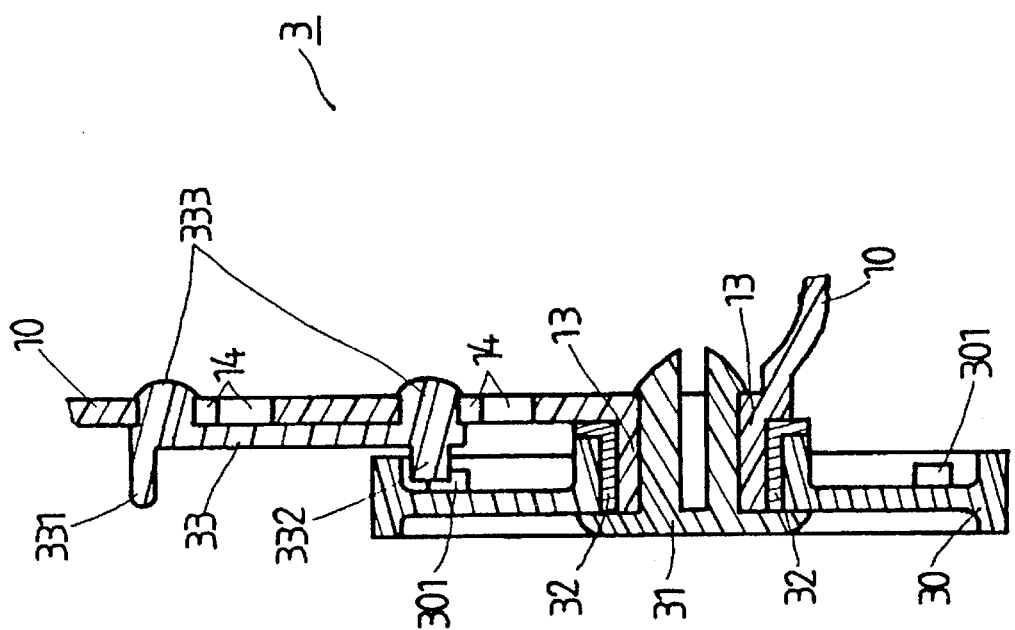
FIG. 4 is a cross sectional view of the wheel attachment as shown in FIG. 3.
Figure 3:
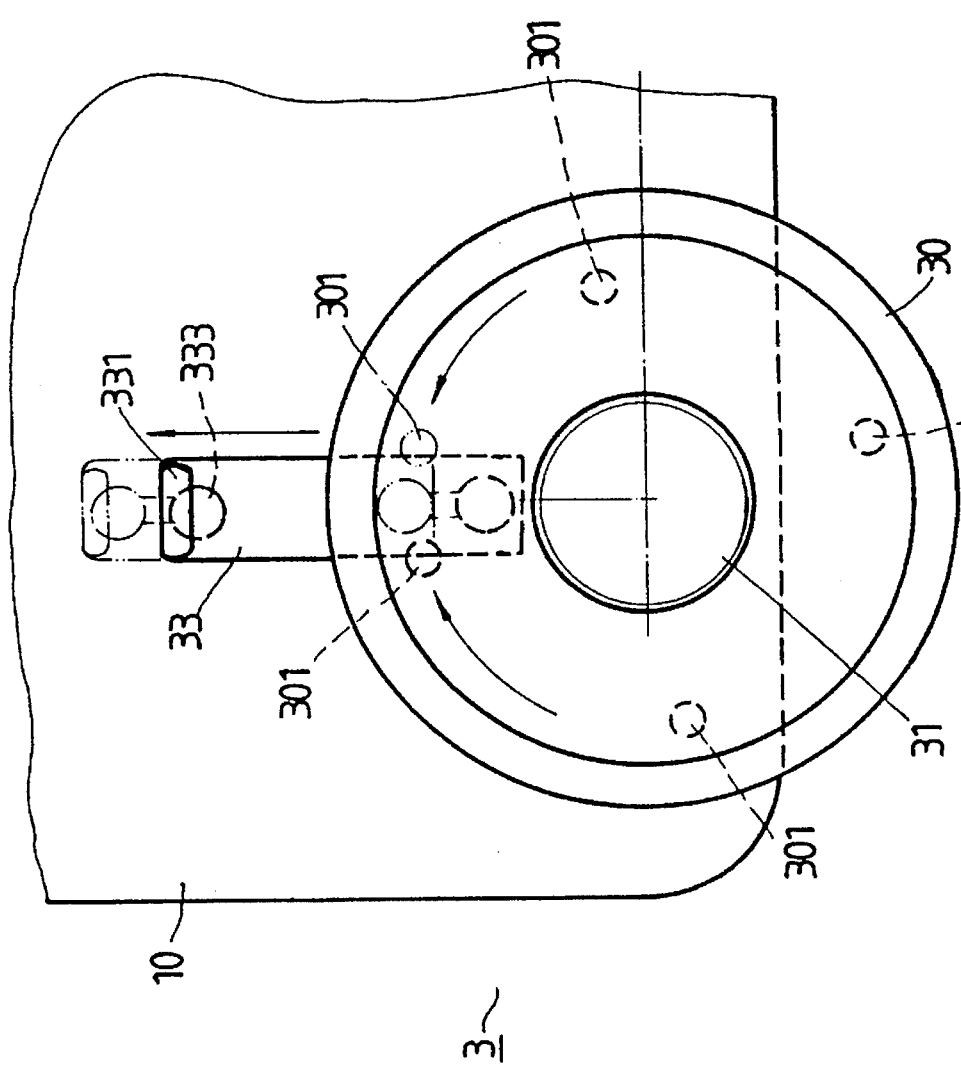
FIG. 3 is a plane view of a wheel attachment.

Referring next to FIGS. 3 and 4 and again to FIG. 1, a packing 32 is engaged on each of the wheel axles 13, a wheel 30 is engaged on each of the packings 32, and a engaging means 31 is engaged in the axle 13 for securing the wheels 30 to the axles 13. The wheel 30 includes four spaced stubs 301 provided in the inner surface facing toward the compartment 10. Four stops 33 each includes two extensions 333 extended therefrom for engaging with the apertures 14 of the compartments Each of the apertures 14 includes an 8-shaped configuration such that the extensions 333 may move upward and downward in the respective apertures 14. The stops 33 each includes a knob 331 provided thereon for operating the stops 33, and each includes a bulge 332 extended therefrom for engaging with the stubs 301 of the wheels 30. As shown in FIGS. 3 and 4, when the stops 33 are pulled upward, the bulges 332 are located between the stubs 301 so as to limit the rotational movements of the wheels 30. However, when the stops 33 are depressed downward, the bulges 332 are disengaged from the stops 33 such that the wheels 30 may rotate freely.

Referring next to FIGS. 5, 6 and again to FIG. 1, an actuating member 401 is formed between the knob 40 and the shaft 402 and includes a cavity 4011 formed therein. The shaft 402 is engaged with a cap 42 so as to secure the cap 42 to the door 20. A latch 41 is slidably engaged between the cap 42 and the door 20 and includes a pin 411 engaged in the cavity 4011 such that the latch 41 may be actuated by the knob 40 in order to engage with the orifices 16 of the compartments 10 so as to retain the doors 20 in the closed position.

Figure 8:
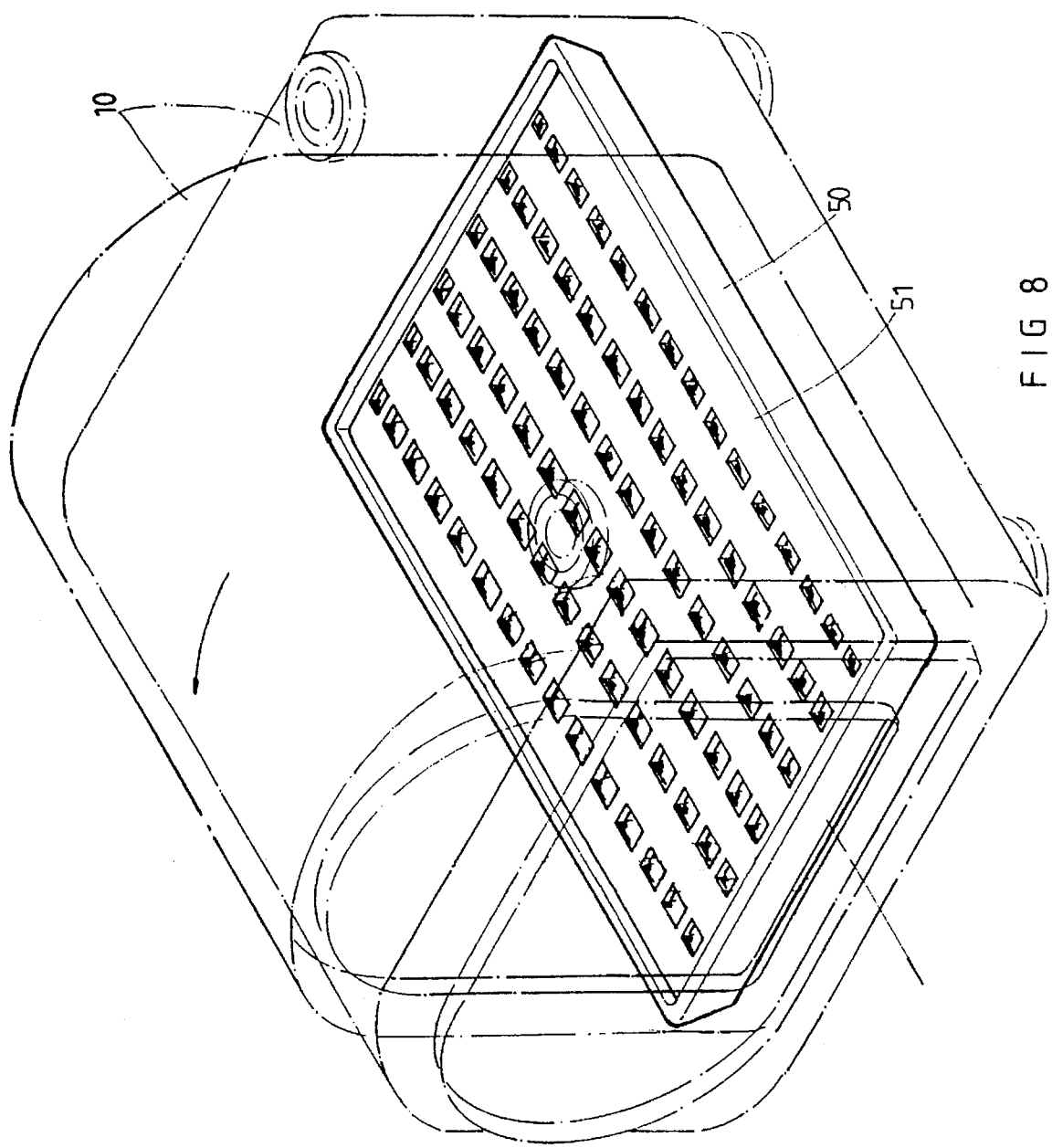
FIG. 8 is a perspective view illustrating the bottom portion of the animal house.
Figure 9:
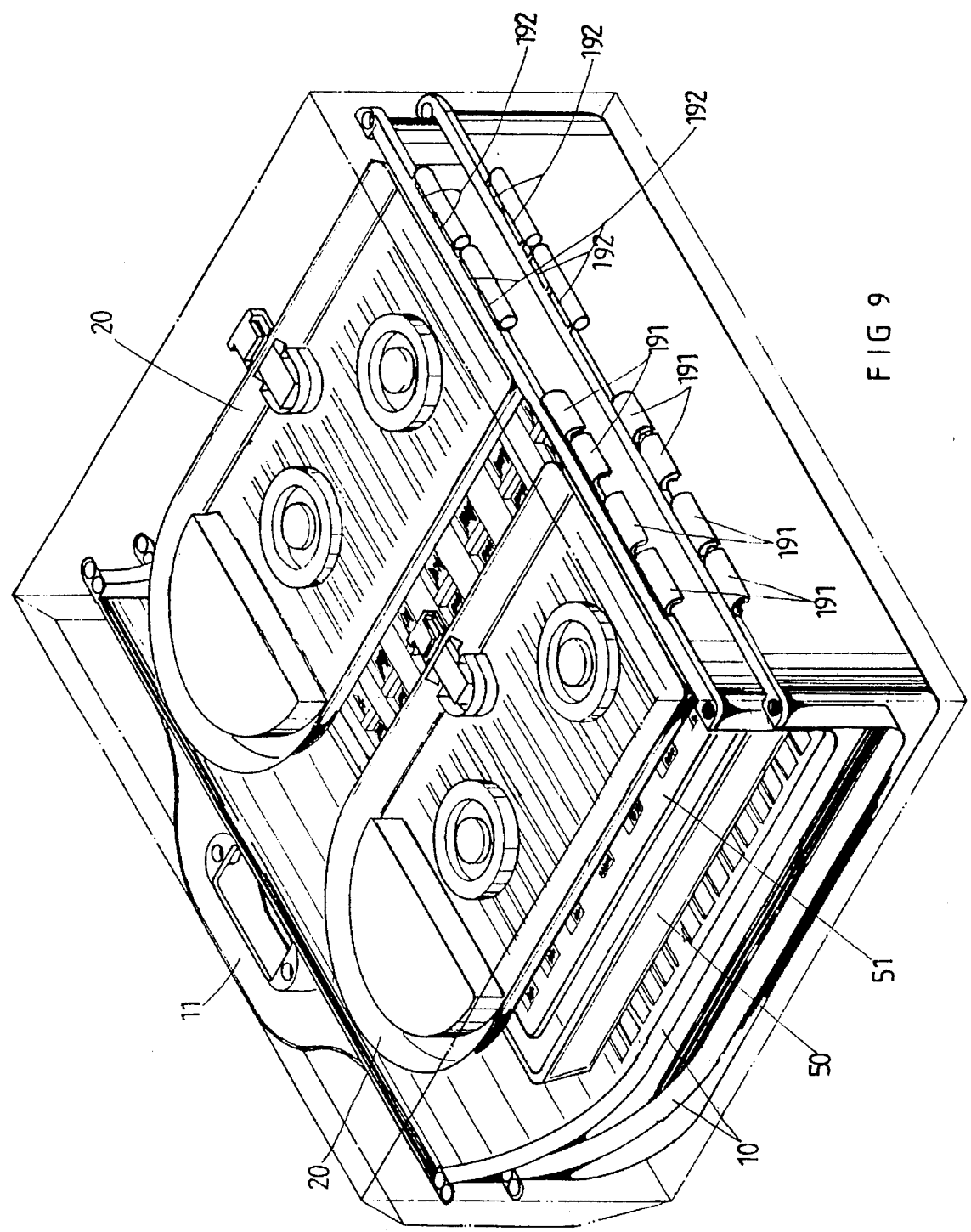
FIG. 9 is a perspective view illustrating the folded configuration of the animal house.

Referring next to FIG. 8, a tray 50 and a mesh type device 51 may be disposed in the bottom portion of the animal house for receiving animal discharge. As best shown in FIG. 9, the elements of the animal house may be disassembled and arranged in a rather compact configuration and can be stored in a small box, as shown in dotted lines in FIG. 9, which is good for transportation purposes.

Accordingly, the animal house in accordance with the present invention includes four wheels 30 such that the animal house can be easily moved. The animal house includes a configuration that can be easily assembled and disassembled and that can be packaged in a small box.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A movable animal house comprising:

a pair of compartments including a lower portion pivotally coupled together and including an upper portion having a grip means provided thereon, said pair of compartments including a bottom portion having at least two wheel axles extended therefrom, and including at least one open side portion having a door pivotally coupled thereto for enclosing said open side portion, means for locking said door to said compartments, and at least two wheels rotatably engaged on said wheel axles for moving said animal house, said pair of compartments include at least two stop means slidably disposed therein, each said stop means includes a bulge extended therefrom, said wheels each include at least two stubs extended therefrom, said each bulge is located between said at least two stubs for limiting rotational movement of said wheels, and said wheels are freely rotatable when said bulge is disengaged from said stubs; and said pair of compartments further include at least two pairs of 8-shaped apertures, and said stop means each includes two extensions engaged in said apertures such that said extensions are movable up and down in said apertures.

2. The movable animal house of claim 1 wherein:

said door further includes a recess formed therein, and a lid means pivotally coupled to said door enclosing said recess.

3. A movable animal house comprising:

a pair of compartments including a lower portion pivotally coupled together and including an upper portion having a grip means provided thereon, said pair of compartments including a bottom portion having at least two wheel axles extended therefrom, and including at least one open side portion having a door pivotally Coupled thereto for enclosing said open side portion, means for locking said door to said compartments, and at least two wheels rotatably engaged on said wheel axles for moving said animal house, said locking means includes a cap secured to said door, a latch slidably engaged between said cap and said door, a knob including a shaft extended through said door engaging with said latch so as to move said latch when said knob is rotated, said latch is moved to engage with said compartments by said knob so as to secure said door to said compartments.

4. The movable animal house of claim 3 wherein:

said door further includes a recess formed therein, and a lid means pivotally coupled to said door enclosing said recess.

* * * * *